Patented Aug. 15, 1933

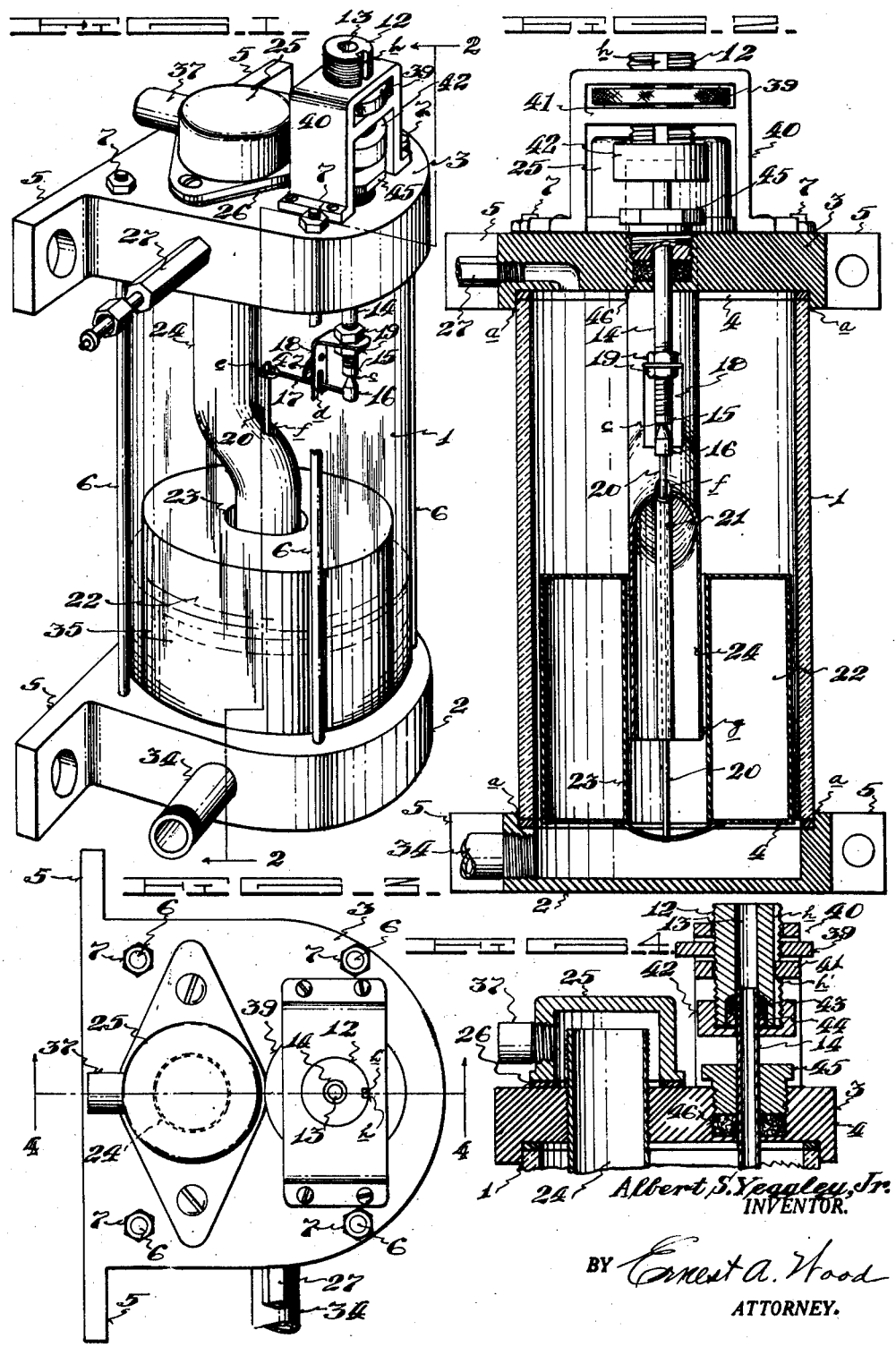

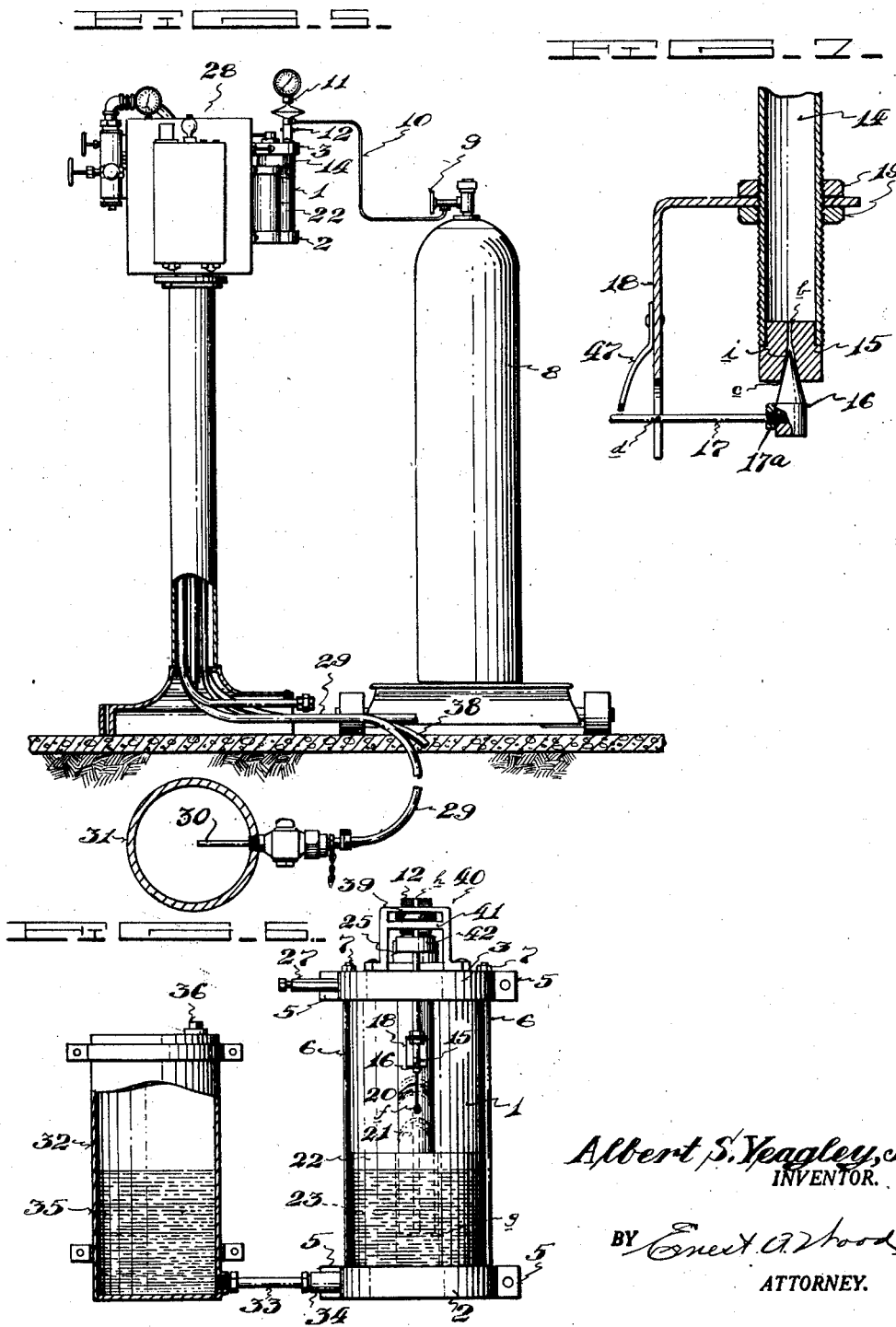

1,922,268

UNITED STATES PATENT OFFICE 1,922,268

VALVE CONTROLLING APPARATUS FOR CHLORINATORS

Albert S. Yeagley, Jr., Dallas, Tex., assignor to Wallace & Tiernan Company, Inc., Belleville, N. J., a Corporation of New York Application January 10, 1931. Serial No. 507,807

3 Claims. (Cl. 210—28)

This invention relates to pressure regulating and controlling apparatus for gas and vapors, or the like, and has particular reference to the type of pressure regulator and controlling valve for use in conjunction with chlorinators whereby chlorine is injected into water mains, sanitary sewers, or other places where it is necessary for the sake of health, to sterilize or deodorize, and its principal object is to provide a combination of elements capable of regulating and controlling the pressure of chlorine gas or vapor to insure the injection of a desired amount of the treating agent without regard to the temperatures.

Another object of the invention is to provide an apparatus capable of being controlled by the pressure of such gas or vapors without the aid of any human agency, requiring only an adjustment to place the device in operation, and which will allow only a uniform amount of such gas or vapors to be passed through the device into the injector mechanism which discharges such gas or vapor into the water supply, sewage basin, or the like.

Still another object of the invention is to provide an apparatus of the kind referred to characterized by simplicity in construction, and few working parts to become inoperable, thereby minimizing the possibility of permitting too much of the chlorine to be passed through the chlorinator.

Broadly, the invention comprehends the provision of a pressure controlling apparatus which will eliminate the necessity of constant supervision to insure a proper flow of the gas, which latter is highly susceptible to variation in temperature and which, due to its last named propensity, would require that it be kept at a given temperature at all times unless some means were provided to take care of the fluctuation in pressure which increases and decreases according to changes in the temperature of the room or building in which the supply is stored.

With the foregoing objects as paramount, the invention has further reference to other lesser objects and salient features of construction which will become manifest as the description proceeds, taken in connection with the appended drawings, which illustrate an embodiment of the invention, and wherein:

Figure 1 is a perspective view of the main part of the apparatus.

Figure 2 is a sectional view of the invention taken on line 2—2 of Figure 1.

Figure 3 is a plan view.

Figure 4 is a section through the head of the float container taken on line 4—4 of Figure 3, illustrating the valve regulating arrangement and gas outlet.

Figure 5 is an elevational view of a known type of chlorinator, showing the invention attached, a conventional type of chlorine container, and a cross section of a water main and discharge nozzle.

Figure 6 is an elevational view of the part of the apparatus shown in Figs. 1 to 4 connected to the auxiliary liquid container, a portion of the latter being cut away to show the fluid level therein, and, Figure 7 is a cross sectional view of the gas inlet tube, interchangeable valve seat and valve and valve adjusting arrangement.

Chlorine, because of its highly disinfectant qualities, has been applied to the disinfection of water supplies for many years with marked success. It is recognized, also, as a deodorant and in many instances it is used for bleaching purposes by flour mills, or the like, all of which uses require the use of chlorinators or apparatus for the proper distribution of the gas.

Ordinarily, chlorine is stored in liquid form in high pressure tanks, such as that shown in the accompanying drawings, and, when allowed to escape, vaporizes and passes into the chlorinator in Fig. 5 of the form of gas. Being highly susceptible to variations in temperature, expanding and contracting as the temperature rises and falls, it is necessary that some device be provided to control the flow of the gas. It would be impractical, if not impossible, to store chlorine in a room or building in which a given temperature could be maintained at all times.

Proceeding with the description, the apparatus comprises a glass walled case or container 1 formed by a glass cylinder, as illustrated in Figures 1 and 2, seated in recesses $a$ in a base 2 and head 3 and sealed by gaskets 4 which latter are placed within the recesses $a$ of the base 2 and head 3, as illustrated particularly in Figure 2. This arrangement provides an airtight chamber within the container 1.

The base member 2 and head 3 are preferably constructed of hard rubber, or similar material, which will not deteriorate when brought into contact with chlorine.

These members, while they define a circular recess into which the container cylinder is seated, are only partly circular in shape, and have ears 5 through which bolts may be placed to secure the invention to the wall or to a chlorinator.

The shape of the members 2 and 3 is shown in Figure 3. The base and head members are held to the cylindrical member of the container by means of clamp rods 6 passed through the base member 2 and the head 3 immediately adjacent to and on all sides of the cylinder and secured by nuts 7, as illustrated particularly in Figure 1.

Referring now to Figure 5, which shows a known type of chlorinator to which the invention is attached, when the chlorine gas is released from the tank 8 by opening the valve 9, it passes through the pipe or tube 10 and through the tank pressure gage 11 which is attached to threaded sleeve 12, shown in Figures 1, 2, and 3, and enters the container 1 through the passage 13 of the sleeve 12 and a tube 14 and the orifice $b$ in a valve seat 15, the latter being shown in detail in Figure 7, the flow of chlorine through the orifice $b$ being controlled by a needle valve 16 which seats itself at $c$ in the valve seat 15.

The needle valve 16 is threaded to an arm 17 which is pivoted at $d$ approximately midway of its length to a bifurcated bracket 18 which latter is attached to the tube 14 and secured between lock nuts 19 threaded upon the lower end of the tube 14, as shown in detail in Figure 7. The needle valve 16 is held in an upright position by lock nut 17a. This arrangement permits the arm 17 to be raised and lowered by adjusting the lock nuts 19 up or down to cause the valve 16 to seat early or late according to the amount of chlorine it is desired to have pass through the orifice $b$. The opposite end of the arm 17 is bifurcated and pivoted at $e$ to a rod 20 which latter extends downward through a tube 21 to a point near the bottom of a float 22 which is also constructed preferably of a material such as hard rubber, or the like. The float 22, is annular in shape, having an opening or passage 23 through its center to accommodate a vent pipe 24 which serves as a guide for the float as the latter rises and falls, and which terminates in an open end near the bottom of the float, as illustrated in Figure 2. Above the float the vent pipe curves to one side as indicated in Figure 1, and then extends upward through the head 3 and into a cap 25 situated on top of the float container, as shown in Figures 1, 3, and 4, and sealed by a gasket 26. The tube 24 has threaded engagement with the head 3 to prevent the escape of gas into the cap 25 except through the vent 24. The tube 21, through which the rod 20 operates is brazed or otherwise secured within an aperture $f$ in the curved wall of the vent pipe 24 and extends downward to the lower end of the latter and acts as a guide for the rod 20, as the float 22 moves up and down, while the lower end of the vent pipe 24 guides the float 22. It is necessary that the tube 21 be sealed against leakage of gas at the aperture $f$.

The chlorine gas discharged into the container 1, as previously explained, through the orifice $b$, passes from the container through a connection 27 into the injector and measuring apparatus 28 and thence through a flexible tube 29 and discharge nozzle 30 into the water in conduit 31, or other point of discharge, as shown in Figure 5.

To enable the liquid in the float container 1 to rise and fall with variation in gas pressure therein and thereby actuate the float 22, an auxiliary liquid container 32 is provided, the latter being shown in Figure 6, and connected by means of a tube 33 to the nipple 34 in the base 2 of the float container.

The containers 1 and 32 are charged with the desired volume of liquid 35 through an opening in the top of the container 32 which is normally closed by a removable plug 36. This plug has a small aperture to allow air to flow in or out of the container 32 and so prevent changes in liquid level in the container 32 from causing pressure changes therein which would dampen the response of the liquid 35 to variations of gas pressure in the float container. With the pressure in the float container atmospheric the liquid levels in the two containers will be the same. The container 32 is shown in Fig. 6 as not provided with means for maintaining a constant level of liquid therein and the use of such a simple container has certain advantages. Obviously, however, this container might be a constant level box or container.

The gas inlet valve 16 is controlled by the float 22 to maintain a substantially constant gas pressure in the float container, and the pressure thus maintained depends on the adjustment of the valve with relation to the amount of liquid in the containers. Means for so adjusting the valve by raising or lowering the valve assembly is hereinafter described. If the adjustment is such that the float just closes the valve when the liquid level in the two containers is the same substantially atmospheric pressure will be maintained in the float container. To maintain a slightly positive or super-atmospheric gas pressure in the container 1 the adjustment of the valve assembly with relation to the amount of liquid should be such that when the liquid level in the two containers is the same the float holds the inlet valve open, then, as the gas pressure in the container 1 increases, because of the gas entering the container faster than it is withdrawn through the connection 27, the float will move the valve towards its closed position until the predetermined maximum pressure is reached, at which time the valve is closed. If, however, the valve assembly is raised so that the float does not open the valve until the liquid level in the float container has been raised by pressure reduction above the level in the container 32, then a negative or sub-atmospheric pressure will be maintained in the float container.

Should the valve 16, because of becoming worn or by particles of dirt or grit be prevented from seating properly when the maximum desired pressure is reached, the pressure in the float chamber may rise above such maximum, in which case the liquid level in the chamber will be depressed until it is below the bottom of the vent tube 24 whereupon gas will pass through the tube 24 to the cap 25 from which it will escape through a connection 37 and pipe 39 to be discharged at a suitable point.

To provide for convenient adjustment of the valve assembly for varying the pressure maintained in the float container and for compensating for any change in the liquid level which may result from evaporation or failure of the operator to fill the containers to the proper level, the apparatus is provided in addition to the nuts 19 for adjusting the valve 16 with means for raising and lowering the tube 14 from the top of the float container. This adjustment is accomplished by rotating a knurled nut 39 which is threaded upon the sleeve 12 in the manner shown in Figures 1, 2, and 4.

A bracket 40 is secured by screws, or other suitable means, to the top of the container head 3, through which the sleeve 12 is disposed, and while the bracket 40 is substantially wicket shaped, a division 41, situated near the top of the bracket 40, defines a narrow compartment in which the knurled nut 39 operates, as shown in Figures 2 and 4.

As shown by Figure 4, the sleeve 12 has a longitudinal slot $h$ into which a projection $h'$ extends from the division 41 to prevent the sleeve 12 from rotating when the knurled nut 39 is operated thereon, allowing the former to move vertically only.

The tube 14 is secured in the passage 13 of the sleeve 12 by means of a ferrule 42, through which the upper end of the tube 14 projects, and which is threaded to the lower end of the sleeve 12 against a packing washer 43 and a packing gland 44, a cross section of which arrangement is illustrated in Figure 4. By this assembly, the tube 14 is held fast within the lower end of the sleeve 12 and, as a consequence, by moving the latter upward and downward, the valve seat 15 may be raised and lowered as desired. In order to prevent leakage through the aperture through which the tube 14 passes out of the head 3, a packing nut 45 is threaded into the head 3 against a packing washer 46, as shown in Figures 2 and 4.

A stop 47 is provided and is riveted, or otherwise secured, to the bracket 18 as shown in detail in Figure 7. It is obvious that this arrangement will prevent the valve 16 from dropping so low as to allow the needle point $i$ of said valve to pass out of the orifice at $c$ which would possibly result in the disarrangement of the valve assembly in that the point $i$ of the valve 16 might come in contact with the lower rim of the valve seat 15 rather than to pass into the orifice at $c$ in which it must be seated to insure a proper seal.

Though the invention has been described with great particularity, the invention is not to be considered as limited to the details of the embodiment of the invention herein shown, as changes in arrangement and substitution of equivalents may be made by those skilled in the art without departing from the invention as defined in the appended claims.

What is claimed is:

1. In combination with a chlorinator, gas pressure regulating apparatus including two liquid containers connected for the passage of liquid therebetween, a float controlled by the liquid level in one of said containers, a valve actuated by said float for controlling the flow of gas into said container to maintain a supply of gas therein under substantially constant pressure for supply therefrom to the chlorinator, and a vent pipe extending from a point in said container below the valve closing liquid level and above the connection to the other container for discharging gas from the float container to atmosphere when the gas pressure in the container rises above a predetermined pressure.

2. In a chlorinator, gas pressure controlling apparatus including a container having a transparent casing and containing a float actuated valve, means for guiding said valve, a second container connected to the first container for the passage of liquid therebetween for maintaining a liquid level in said first container to support said float and maintain normal cracked position of said valve, whereby to effect normal delivery of gas into the water to be treated, and a vent pipe extending downward from the top of the first container to a point below the normal liquid level therein for escape of gas to atmosphere when the pressure thereof is increased beyond that normally required for closing said valve.

3. In a chlorinator, a chlorine gas pressure regulator comprising two containers connected at their lower parts for flow of liquid therebetween, a float in the first container, gas inlet and discharge conduits connected to the upper part of the first container, a valve adapted to control the flow of gas through said inlet conduit, a connection between said float and said valve arranged so that the valve is opened by a rising movement of the float, and a substantially constant volume of liquid in the two containers combined whereby a rise in liquid level in the first container produces a corresponding drop in the level in the second container and vice versa, and a vent tube in the first container extending downward therein to a point below the valve closing level of the liquid in said container.

ALBERT S. YEAGLEY, Jr.